(12) United States Patent
Lu et al.

(10) Patent No.: US 12,327,530 B2
(45) Date of Patent: Jun. 10, 2025

(54) BACKLIGHT MODULE AND DISPLAY DEVICE

(71) Applicant: SUZHOU CHINA STAR OPTOELECTRONICS TECHNOLOGY CO., LTD., Suzhou (CN)

(72) Inventors: Junhong Lu, Suzhou (CN); Teng Liu, Suzhou (CN); Jun Yan, Suzhou (CN)

(73) Assignee: SUZHOU CHINA STAR OPTOELECTRONICS TECHNOLOGY CO., LTD., Suzhou (IL)

( * ) Notice: Subject to any disclaimer, the term of this patent is extended or adjusted under 35 U.S.C. 154(b) by 0 days.

(21) Appl. No.: 17/795,628

(22) PCT Filed: Jul. 26, 2022

(86) PCT No.: PCT/CN2022/107764
§ 371 (c)(1),
(2) Date: Jul. 27, 2022

(87) PCT Pub. No.: WO2024/016370
PCT Pub. Date: Jan. 25, 2024

(65) Prior Publication Data
US 2024/0185808 A1 Jun. 6, 2024

(30) Foreign Application Priority Data

Jul. 18, 2022 (CN) .......................... 202210839627.0

(51) Int. Cl.
*G09G 3/34* (2006.01)
*G09G 3/00* (2006.01)

(52) U.S. Cl.
CPC ........... *G09G 3/3426* (2013.01); *G09G 3/006* (2013.01); *G09G 2320/0233* (2013.01); *G09G 2320/064* (2013.01)

(58) Field of Classification Search
CPC ................. G09G 3/3426; G09G 3/006; G09G 2320/0233; G09G 2320/064
See application file for complete search history.

(56) References Cited

U.S. PATENT DOCUMENTS

| 2008/0054818 A1* | 3/2008 | Soo ......................... H05B 45/22 |
| | | 315/247 |
| 2009/0021183 A1* | 1/2009 | Ye ...................... H05B 45/3725 |
| | | 315/291 |

(Continued)

FOREIGN PATENT DOCUMENTS

| CN | 101848574 A | 9/2010 |
| CN | 112233610 A | 1/2021 |

(Continued)

OTHER PUBLICATIONS

PCT International Search Report for International Application No. PCT/CN2022/107764, mailed on Dec. 21, 2022, 10pp.

(Continued)

*Primary Examiner* — Kenneth B Lee, Jr.
(74) *Attorney, Agent, or Firm* — The Roy Gross Law Firm, LLC; Roy D. Gross

(57) ABSTRACT

The present application provides a backlight module and a display device. The backlight module includes multiple light-emitting units, at least one driving chip, and an adjustment module. In the driving chip, control units are used to control the respective corresponding light-emitting unit to emit light based on control signals. Each control unit has a feedback node. A signal acquisition unit is connected to the feedback nodes to collect feedback voltages of the feedback nodes. An adjustment module is connected to the at least one (Continued)

driving chip and is used to adjust light-emission brightness of the light-emitting units according to the feedback voltages.

18 Claims, 3 Drawing Sheets

(56) References Cited

U.S. PATENT DOCUMENTS

| | | | |
|---|---|---|---|
| 2011/0050131 A1* | 3/2011 | Je | G09G 3/3406 |
| | | | 315/297 |
| 2011/0298384 A1* | 12/2011 | Tanigawa | G09G 3/3406 |
| | | | 315/209 R |
| 2011/0309765 A1* | 12/2011 | Hsieh | G09G 3/32 |
| | | | 315/250 |

FOREIGN PATENT DOCUMENTS

| | | |
|---|---|---|
| CN | 112233625 A | 1/2021 |
| CN | 112992064 A | 6/2021 |
| CN | 113140190 A | 7/2021 |
| CN | 114038400 A | 2/2022 |
| CN | 114708839 A | 7/2022 |
| KR | 20130130526 A | 12/2013 |
| WO | 2022077719 A1 | 4/2022 |

OTHER PUBLICATIONS

PCT Written Opinion of the International Search Authority for International Application No. PCT/CN2022/107764, mailed on Dec. 21, 2022, 11pp.

Chinese Office Action issued in corresponding Chinese Patent Application No. 202210839627.0 dated Dec. 31, 2024, pp. 1-7, 16pp.

* cited by examiner

BACKLIGHT MODULE AND DISPLAY DEVICE

This application is a National Phase of PCT Patent Application No. PCT/CN2022/107764 having International filing date of Jul. 26, 2022, which claims the benefit of priority of Chinese Patent Application No. 202210839627.0, filed Jul. 18, 2022, the contents of which are all incorporated herein by reference in their entirety.

FIELD OF DISCLOSURE

The present application relates to a field of display technology and in particular, to a backlight module and a display device.

DESCRIPTION OF RELATED ART

With the continuous development of display technology and panel industry, micro/mini light-emitting diode (MLED) backlight technology has attracted the public's great attention. Compared with conventional light-emitting diode (LED) backlight, MLED backlight has the function of local dimming (local backlight adjustment), which can achieve high contrast ratios and high brightness, and the display performance is close to organic light-emitting diode (OLED).

In the MLED backlight, a greater number of MLEDs are driven by different driving chips. A common practice is that multiple MLEDs share the same positive terminal, each channel of the driving chip is connected to a negative terminal of the MLED, and a switch transistor is turned on or off under the control of pulse width modulation (PWM) so as to adjust a current to control brightness of the MLEDs. However, due to some reasons like IR drop (voltage drop) and manufacturing processes, different MLEDs have different brightness, resulting in uneven brightness and darkness of the backlight module.

SUMMARY

The present application provides a backlight module and a display device to solve a technical problem of uneven brightness and darkness of the conventional backlight module.

The present application provides a backlight module, including:
a plurality of light-emitting units, wherein each of the light-emitting units includes a positive terminal and a negative terminal;
at least one driving chip, wherein each of the at least one driving chip includes a plurality of control terminals, a signal acquisition unit, and a plurality of control units connected to the control terminals, wherein each of the control terminals is connected to the negative terminal of the corresponding light-emitting unit, each of the control units is connected to a control signal and is also connected to a ground terminal, each of the control units controls the corresponding light-emitting unit to emit light based on the control signal, each of the control units includes a feedback node, and the signal acquisition unit is connected to each of the feedback nodes to acquire a feedback voltage of this feedback node; and
an adjustment module connected to the at least one driving chip, wherein the adjustment module adjusts brightness of the light-emitting units according to the corresponding feedback voltages.

Optionally, according to some embodiments of the present application, in each of the control units, the control unit includes a switch transistor and a resistor, a gate of the switch transistor is connected to the control signal, a source of the switch transistor is connected to one of the control terminals, a drain of the switch transistor and one end of the resistor are connected to one end of the feedback node, and another end of the resistor is connected to the ground terminal.

Optionally, according to some embodiments of the present application, each of the at least one driving chip includes multiple control terminals and multiple control units, the control units are connected to the control terminals in a one-to-one correspondence, the signal acquisition unit includes a plurality of collection terminals, a number of the collection terminals is greater than or equal to a number of the control terminals, and each of the collection terminals is connected to the feedback node in one of the control units.

Optionally, according to some embodiments of the present application, in each of the at least one driving chip, the signal acquisition unit collects the feedback voltages of the feedback nodes within a preset time period and obtains an average value of the feedback voltages of the feedback nodes within the preset time period.

Optionally, according to some embodiments of the present application, in each of the at least one driving chip, the signal acquisition unit is an analog-to-digital conversion module, and the signal acquisition unit converts each of the collected feedback voltages into a corresponding digital signal.

Optionally, according to some embodiments of the present application, in each of the at least one driving chip, the backlight module further includes a storage unit, the storage unit is connected to the signal acquisition unit, and the storage unit stores the feedback voltages.

Optionally, according to some embodiments of the present application, one storage unit is disposed inside or outside each of the at least one driving chip and is connected to the signal acquisition unit of each of the at least one driving chip.

Optionally, according to some embodiments of the present application, the adjustment module includes a comparison unit and a processing unit, the comparison unit is configured to compare each feedback voltage with a preset voltage to obtain a comparison result, the processing unit adjusts the brightness of the light-emitting units according to the comparison results.

Optionally, according to some embodiments of the present application, the control signal connected to each of the control units is a pulse width modulation (PWM) dimming signal, and the processing unit adjusts a duty cycle of the PWM dimming signal according to the corresponding comparison result.

Optionally, according to some embodiments of the present application, the control signal connected to each of the control units is a direct-current (DC) signal, and the processing unit adjusts a voltage of the control signal according to the corresponding comparison result.

Optionally, according to some embodiments of the present application, the backlight module includes a plurality of light-emitting sub-areas, each of the light-emitting sub-areas includes one of the light-emitting units, and the processing unit adjusts the brightness of each of the light-emitting units according to the corresponding comparison result.

Optionally, according to some embodiments of the present application, the backlight module includes a plurality of light-emitting sub-areas, each of the light-emitting sub-areas includes multiple light-emitting units connected to the same driving chip, the positive terminals of the light-emitting units connected to the same driving chip are connected to a same initial driving voltage, and the processing unit adjusts a value of each of the initial driving voltages according to the corresponding comparison result.

Optionally, according to some embodiments of the present application, each of the light-emitting units includes one or more light-emitting diodes.

The present application further provides a display device, including a display panel and a backlight module, wherein the backlight module is the backlight module mentioned above.

ADVANTAGES OF THE PRESENT APPLICATION

The present application provides a backlight module and a display device. The backlight module includes a plurality of light-emitting units, at least one driving chip and an adjustment module. Each light-emitting unit includes a positive terminal and a negative terminal. Each driving chip includes a plurality of control terminals, a signal acquisition unit, and a plurality of control units respectively correspondingly connected to the plurality of control terminals. The control terminal is connected to the negative terminal of the corresponding light-emitting unit. The control unit is connected to the control signal and connected to a ground terminal. The control unit is used for controlling the corresponding light-emitting unit to emit light according to the control signal. The control unit includes a feedback node. The signal acquisition unit is connected to the feedback node to collect a feedback voltage of the feedback node. The adjustment module is connected to the driving chip and is used for adjusting the brightness of the light-emitting units according to the feedback voltages. It can be understood that when a path is established between the light-emitting unit, the control unit, and the ground terminal, the light-emitting unit emits light. In the present application, the feedback node is set in each control unit, and the signal acquisition unit is included in the driving chip. Therefore, by collecting the feedback voltages of the feedback nodes, a current flowing through each light-emitting unit can be obtained, thereby brightness differences between multiple light-emitting units can be determined. Then, brightness of the light-emitting units is adjusted by the adjustment module, so as to improve light-emission uniformity of the backlight module.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DETAILED DESCRIPTION OF EMBODIMENTS

The technical solutions of the present application are clearly and completely described below with reference to the accompanying drawings and in conjunction with specific embodiments. Obviously, the described embodiments are only some of the embodiments of the present application, but not all of the embodiments. Based on the embodiments in this application, all other embodiments obtained by those skilled in the art without creative work shall be deemed to fall within the protection scope of the present application.

In the present application, it should be understood that the terms "first" and "second" are only used for illustrative purposes and cannot be interpreted as indicating or implying relative importance or implicitly indicating a number of indicated technical features. Thus, features defined by "first", "second", and the likes can expressly or implicitly include one or more of said features, and therefore should not be construed as limiting the application. In addition, it should be noted that, unless otherwise expressly specified and defined, the terms "connected" and "coupled" should be understood in a broad sense. For example, elements can be mechanically connected or electrically connected. Elements can be directly connected or connected through an intermediary and can communicate with each other internally. For those of ordinary skill in the art, the specific meanings of the above terms in the present invention can be understood in a case-by-case basis.

The present application provides a backlight module and a display device, which can be described in detail below. It should be noted that a description order of the following embodiments is not intended to limit a preferred order of the embodiments of the present application.

Figure 1:
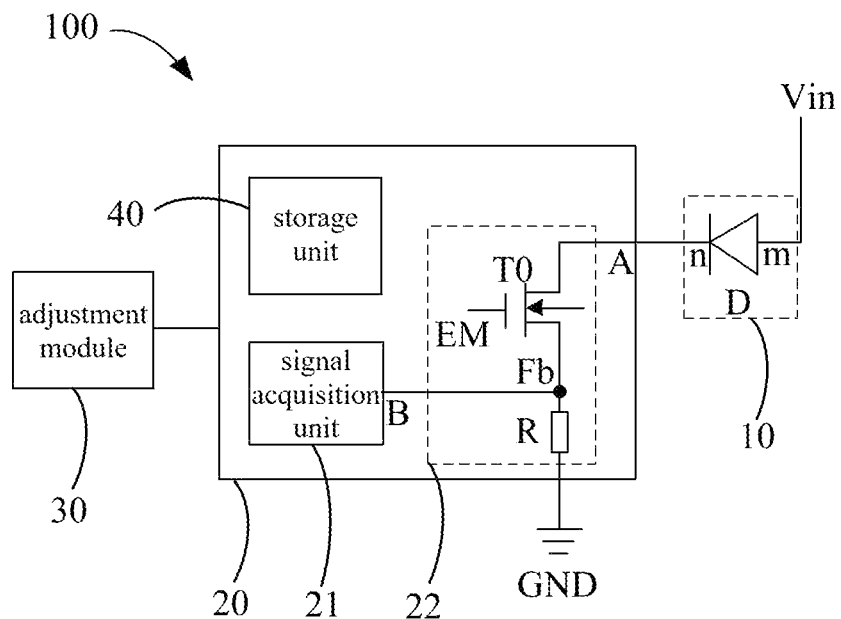
FIG. 1 is a first diagram illustrating a backlight module according to one embodiment of the present application.

Please refer to FIG. 1. FIG. 1 is a first diagram of a backlight module according to one embodiment of the present application. The present application provides a backlight module 100. The backlight module 100 includes a plurality of light-emitting units 10, at least one driving chip 20, and an adjustment module 30.

Each of the light-emitting units 10 has a positive terminal m and a negative terminal n.

Each driving chip 20 includes a plurality of control terminals A, a signal acquisition unit 21, and a plurality of control units 22 connected to the control terminals A. Each control terminal A is connected to the negative terminal n of the corresponding light-emitting unit 10. Each control unit 22 receives a control signal EM and is connected to a ground terminal GND. Each control unit 22 is configured to control the corresponding light-emitting unit 10 to emit light based on the control signal EM. The control unit 22 includes a feedback node Fb. The signal acquisition unit 21 is connected to each feedback node Fb to acquire a feedback voltage of the feedback node Fb.

The adjustment module 30 is connected to the driving chip 20. The adjustment module 30 is configured to adjust brightness (light-emission brightness) of the light-emitting units 10 according to the feedback voltages.

It can be understood that when a path is established between the light-emitting unit 10, the control unit 22, and the ground terminal GND, the light-emitting unit 10 emits light, and a current flows in the path. Therefore, the present application includes the feedback node Fb in each control unit 22 and adds the signal acquisition unit 21 in the driving chip 20. Therefore, by collecting the feedback voltage of each feedback node Fb, a current flowing through each light-emitting unit 10 can be obtained. As a result, the present application can determine differences in the brightness between multiple light-emitting units 10, and the brightness of the light-emitting units 10 can be adjusted by the adjustment module 30 to improve brightness uniformity of the backlight module.

In the present application, each control unit 22 can include, but is not limited to, a switch transistor T0 and a resistor R. A gate of the switch transistor T0 is connected to the control signal EM. A source of the switch transistor T0 is connected to the control terminal A. A drain of the switch transistor T0 and one end of the resistor R are connected to the feedback node Fb. Another end of the resistor R is connected to the ground terminal GND.

The signal acquisition unit 21 can collect the feedback voltage of the feedback node Fb, that is, a voltage-to-ground of the resistor R. By means of the feedback voltage and a resistance of the resistor R, a current flowing through the resistor R can be obtained. That is to say, the current flowing through the light-emitting unit 10 can be obtained. The resistance of the resistor R in the control unit 22 corresponding to each light-emitting unit 10 is relatively constant, so ideally, when the measured feedback voltages are equal, it can indicate that the currents flowing through the light-emitting units 10 are equal, and the light-emitting units 10 have the same light-emission brightness. Therefore, according to the feedback voltages, it is possible to accurately determine the differences in the light-emission brightness of the light-emitting units 10, so as to adjust the light-emission brightness of the light-emitting units 10 and improve the light-emission uniformity of the backlight module 100.

It should be noted that the switch transistor T0 used in all the embodiments of the present application can be a thin film transistor or a field-effect transistor or the likes. Since the source and the drain of the switch transistor T0 are symmetrical, the source and the drain are interchangeable. In the present application, according to the drawings, a middle terminal of the switch transistor T0 is the gate, a signal input terminal is the source, and an output terminal is the drain. In addition, the switch transistors T0 of the present application can be P-type transistors and/or N-type transistors. The P-type transistor is turned on when the gate is at a low level and is turned off when the gate is at a high level. The N-type transistor is turned on when the gate is at a high level and is turned off when the gate is at a low level. It should be noted that, the present application is described by taking the switch transistor T0 as an N-type transistor as an example, which should not be construed as a limitation to the present application.

In the present application, the driving chip 20 can include one or more control terminals A. Each control terminal A is connected to one light-emitting unit 10. The driving chip 20 can also include a plurality of control units 22. The control terminals A are connected to the control units 22 in one-to-one correspondence. For example, the driving chip 20 can include 16 control terminals A, 32 control terminals A, 48 control terminals A, and so on. Since the control terminals A of the driving chip 20 are connected to the negative terminals n of the light-emitting units 10 in a one-to-one correspondence, the light emission of the respective light-emitting units 10 can be individually controlled, thereby realizing the function of local dimming.

It can be understood that the positive terminals of the light-emitting units 10 are usually connected to a same initial driving voltage Vin. If the negative terminals n of the light-emitting units 10 are directly grounded, all the light-emitting units 10 are turned on once the positive terminals m have a voltage, so there is no local dimming. In the present application, the negative terminals n of the light-emitting units 10 are connected to the control terminals A of the driving chip 20, and further connected to the ground terminals GND. The switch transistors T0 are disposed in the driving chip 20. The switch transistors T0 control the connection between the negative terminals n of the light-emitting units 10 and the ground terminals GND. In this way, the function of local dimming can be realized through the control terminals A of the driving chip 20.

In the present application, when the number of the light-emitting units 10 is relatively small, the positive terminals m of all light-emitting units 10 can be connected to the same initial driving voltage Vin, thereby reducing a number of output terminals that output the initial driving voltage Vin and corresponding connection lines, reducing the complexity of a signal generating circuit of the backlight module 100.

Certainly, in the present application, when the backlight module 100 has a relatively larger size and the number of the light-emitting units 10 is relatively greater. In order to better realize the function of local dimming, the light-emitting units 10 can be divided into multiple regions. The positive terminals m of the light-emitting units 10 in each area are connected to the initial driving voltage Vin. That is to say, there are multiple independently controllable initial driving voltages Vin in the backlight module 100. The initial driving voltages Vin can be equal or unequal and can be specifically set according to light-emission brightness requirements of the backlight module 100.

Figure 2:
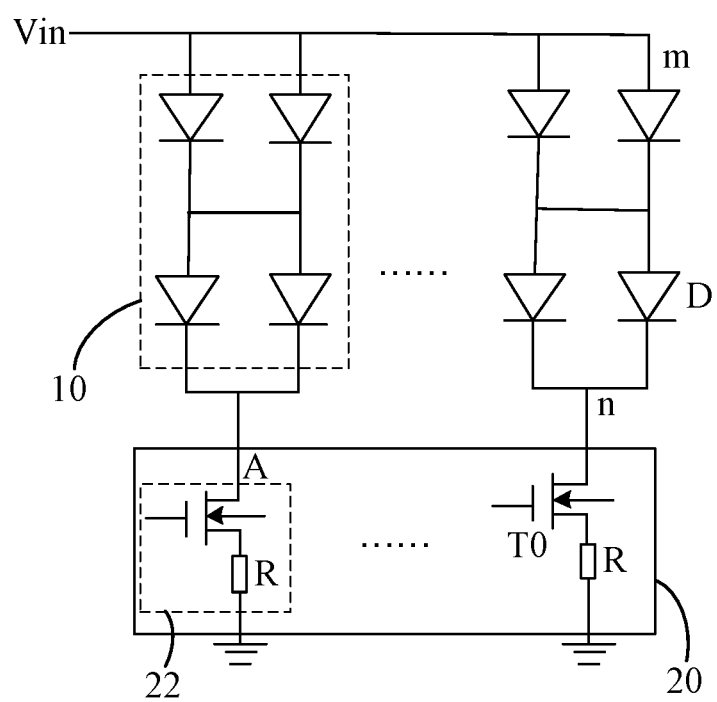
FIG. 2 is a schematic diagram illustrating a connection between a light-emitting unit and a driving chip according to one embodiment of the present application.

In the present application, each light-emitting unit 10 includes one or more light-emitting diodes D. The light-emitting diode D can be a micro LED or a mini LED. For example, as shown in FIG. 2, in some embodiments of the present application, each light-emitting unit 10 includes four light-emitting diodes D. In the four light-emitting diodes D, every two light-emitting diodes D are connected in series to form two series circuits which are then connected in parallel. Of course, the light-emitting unit 10 of the present application is not limited to the above-mentioned structure, and a detailed description is omitted here for brevity.

In the present application, the signal acquisition unit 21 includes a plurality of collection terminals B. A number of the collection terminals B is greater than or equal to a number of the control terminals A. Each collection terminal B is connected to the feedback node Fb in one control unit 22.

It can be understood that the driving chip 20 can include multiple control terminals A and multiple control units 22 connected to the control terminals A in a one-to-one correspondence. Each control unit 22 controls light emission of one light-emitting unit 10 through one control terminal A. Each light-emitting unit 10 has a driving current when emitting light. In order to adjust the brightness uniformity of the backlight module 100, it is necessary to detect the light-emission brightness of each light-emitting unit 10. Therefore, the feedback node Fb in each control unit 22 needs to be detected.

In the present application, the number of the collection terminals B of the signal acquisition unit 21 is greater than or equal to the number of the control terminals A, so that one signal acquisition unit 21 can be connected to each feedback node Fb of all control units 22 in the driving chip 20 to respectively collect the feedback voltages from the feedback nodes Fb. Therefore, the detection of each feedback node Fb can be realized with a reduced number of the signal acquisition units 21, so the structure of the driving chip 20 can be simplified.

Specifically, the feedback voltages by the signal acquisition unit 21 can be collected after the backlight module 100 is powered on and works normally. In an initial stage after the backlight module 100 is powered on, the feedback node Fb is detected to obtain the feedback voltage. The adjustment module 30 adjusts the light-emission brightness of the light-emitting units 10 according to the feedback voltages, thereby improving the light-emission uniformity of the backlight module 100 during operation.

Certainly, in other embodiments, when the backlight module 100 is in operation for a long time, the feedback voltage collection for the feedback nodes fb can be performed at a certain interval according to the usage time of the backlight module 100, so as to realize the real-time adjustment for the light-emitting units 10.

In one embodiment of the present application, the signal acquisition unit 21 is configured to perform one-time feedback voltage collection on the feedback nodes Fb to obtain the feedback voltages of the feedback nodes Fb, thereby improving a detection speed.

In another embodiment of the present application, the signal acquisition unit 21 is configured to collect the feedback voltages of the feedback nodes Fb within a preset time period to obtain an average value of the feedback voltages of the feedback nodes Fb within the preset time period.

It can be understood that the current flowing through the light-emitting unit 10 can fluctuate up and down due to ambient interferences and other reasons, so the collected feedback voltage can also fluctuate up and down. The present application collects the feedback voltages of the feedback nodes Fb within a preset time period and can obtain the average value of the feedback voltages of the feedback nodes Fb within the preset time period. The adjustment module 30 adjusts the light-emission brightness of the light-emitting units 10 according to the average value, which can improve the detection accuracy and further improve the light-emission uniformity of the backlight module 100.

In the present application, the signal acquisition unit 21 can be an analog-to-digital conversion (ACD) module. The ACD module is used to convert the collected feedback voltage into a corresponding digital signal. The adjustment module 30 can be a microcontroller unit (MCU). The microcontroller unit, also known as a single-chip microcomputer or a single processor, has appropriately reduced frequencies and specifications of a central processing unit and is a single chip which integrates peripheral interfaces such as memory, counters, analog-to-digital converters, memories, and even panel driving circuits together. After the signal acquisition unit 21 collects the feedback voltages, the signal acquisition unit 21 converts the feedback voltages into digital signals, and the MCU can process these digital signals.

In the present application, the backlight module 100 further includes a storage unit 40. The storage unit 40 is connected to the signal acquisition unit 21. The storage unit 40 is used to store the feedback voltage.

It can be seen from the above analysis that the signal acquisition unit 21 in each driving chip 20 needs to acquire the feedback voltages of multiple feedback nodes Fb. In some embodiments, the signal acquisition unit 21 needs to collect the feedback voltage of each feedback node Fb for a preset time period. Therefore, each signal acquisition unit 21 collects more signals.

Accordingly, by setting the storage unit 40 in the present application, the feedback voltages collected by the signal acquisition unit 21 can be stored. After the signal acquisition unit 21 completes the feedback voltage collection, the storage unit 40 can send the stored feedback voltages to the adjustment module 30 at one time, so as to prevent a loss of the collected feedback voltages or to prevent incorrect correspondence between the feedback voltages and the light-emitting units 10.

Furthermore, in the present application, the storage unit 40 is disposed inside the driving chip 20. When the backlight module 100 includes multiple driving chips 20, each driving chip 20 is provided with one storage unit 40 inside. The feedback voltage stored in each storage unit 40 is transmitted to the same adjustment module 30.

Figure 3:
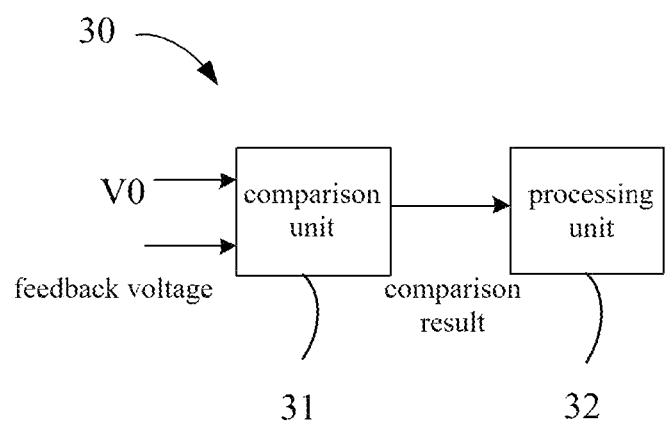
FIG. 3 is a schematic diagram illustrating an adjustment module according to one embodiment of the present application.

In the present application, please refer to FIG. 1 and FIG. 3 at the same time. FIG. 3 is a schematic diagram of the adjustment module of the present application. The adjustment module 30 includes a comparison unit 31 and a processing unit 32. The comparison unit 31 is used for comparing the feedback voltage with a preset voltage V0 to obtain a comparison result. The processing unit 32 adjusts the light-emission brightness of the light-emitting units 10 according to the comparison result.

The comparison result can be that the feedback voltage is higher than, equal to, or lower than the preset voltage V0. When the comparison result is that the feedback voltage is higher than the preset voltage V0, the adjustment module 30 can adjust the brightness of the light-emitting unit 10 corresponding to this feedback voltage. When the comparison result is that the feedback voltage is lower than the preset voltage V0, the adjustment module 30 can increase the brightness of the light-emitting unit 10 corresponding to this feedback voltage. When the comparison result is that the feedback voltage is equal to the preset voltage V0, the adjustment module 30 can maintain the brightness of the light-emitting unit 10 corresponding to this feedback voltage.

Further, a preset difference can be set. When the difference between the feedback voltage and the preset voltage V0 is less than or equal to the preset difference, the brightness of the light-emitting unit 10 corresponding to the feedback voltage can be maintained, thereby a workload can be reduced and adjusted, and power consumption of the adjustment module 30 is reduced.

In the present application, the adjustment module 30 can adjust the light-emission brightness of each light-emitting unit 10 by adjusting the initial output voltage Vin and/or the control signal EM.

Specifically, in the present application, the control signal EM is a PWM dimming signal. The processing unit 32 is configured to adjust a duty cycle of the PWM dimming signal according to the comparison result.

It can be understood that the driving chip 20 receives the external PWM dimming signal and controls the effective current flowing through the light-emitting unit 10 according to the duty cycle of the PWM dimming signal, thereby affecting the brightness of the light-emitting unit 10. The greater the duty cycle of the PWM dimming signal, the higher the effective current flowing through the light-emitting unit 10 and the greater the brightness of the light-emitting unit 10.

Therefore, in the present application, when the feedback voltage is lower than the preset voltage V0, the processing unit 32 can increase the duty cycle of the PWM dimming signal received by the control unit 22 corresponding to the feedback voltage, thereby prolonging the effective light-emission time of the light-emitting unit 10, thus improving the light-emission brightness of the light-emitting unit 10. When the feedback voltage is higher than the preset voltage V0, the processing unit 32 can reduce the duty cycle of the PWM dimming signal received by the control unit 22 corresponding to the feedback voltage, thereby reducing the effective light-emission time of the light-emitting unit 10, thus reducing the light-emission brightness of the light-emitting unit 10. The PWM dimming signal is a pulse width modulation signal, and the "width" is the time of the pulse at the high level. When the PWM dimming signal adjusts the brightness of the light-emitting unit 10, the signal frequency is unchanged, and what changes is the time of the pulse at the high level, that is, the effective light-emission time of the light-emitting unit 10. Adjusting the brightness by this signal is equivalent to adjusting the average current of the light-emitting unit 10, so the light-emission brightness can change.

In some embodiments of the present application, the control signal EM is a direct-current (DC) signal. The processing unit 32 is configured to adjust the voltage of the control signal EM according to the comparison result.

It can be understood that the control signal EM controls ON and Off of the switch transistor T0. The greater the voltage of the control signal EM is, the more sufficiently the switch transistor T0 is turned on, which means that the equivalent resistance of the switching transistor T0 is lower, and the current flowing through the light-emitting unit 10 is higher. On the contrary, the switch transistor T0 cannot be sufficiently turned on, which means that the equivalent resistance of the switch transistor T0 increases, and the current flowing through the light-emitting unit 10 becomes lower.

Therefore, in the present application, when the feedback voltage is lower than the preset voltage V0, the processing unit 32 can increase the voltage of the control signal EM received by the control unit 22 corresponding to the feedback voltage, thereby increasing the light-emission brightness of the light-emitting unit 10. When the feedback voltage is higher than the preset voltage V0, the processing unit 32 can reduce the voltage of the control signal EM received by the control unit 22 corresponding to the feedback voltage, thereby reducing the light-emission brightness of the light-emitting unit 10.

Figure 4:
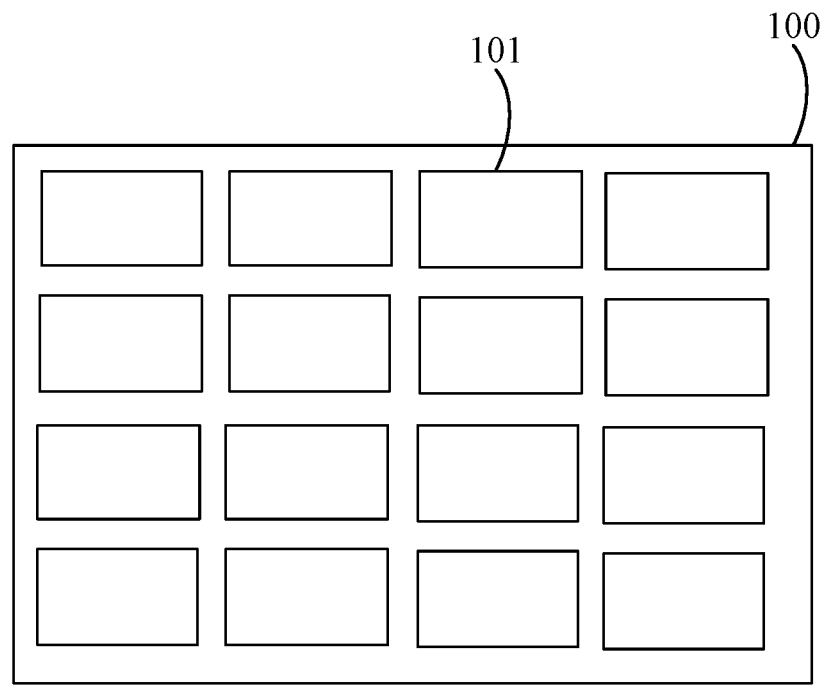
FIG. 4 is a schematic plan view of the backlight module according to one embodiment of the present application.

Please refer to FIG. 1 and FIG. 4 at the same time. FIG. 4 is a schematic plan view of the backlight module according to the present application. In the present application, the backlight module 100 includes multiple light-emitting sub-areas 101.

Specifically, in one embodiment of the present application, each light-emitting sub-area 101 includes one light-emitting unit 10. The processing unit 32 is configured to adjust the light-emission brightness of each light-emitting unit 10 according to the comparison result.

For example, as shown in FIG. 4, the backlight module 100 includes 16 light-emitting sub-areas 101. The four light-emitting sub-areas 101 in each column can be controlled by the same driving chip 20. That is, the backlight module 100 includes four driving chips 20. Each light-emitting unit 10 includes multiple light-emitting diodes D. That is to say, each light-emitting unit 10 is an LED light string.

In the present application, after each driving chip 20 receives an adjustment command from the adjustment module 30, the driving chip 20 can individually control the brightness data of each light-emitting sub-area 101. That is to say, the light-emission brightness of each light-emitting unit 10 can be adjusted by adjusting the control signal EM, so as to realize the brightness adjustment of each light-emitting sub-area 101 and improve the brightness uniformity of the backlight module 100.

In another embodiment of the present application, each light-emitting sub-area 101 includes multiple light-emitting units 10 connected to the same driving chip 20, and the light-emitting units 10 connected to the same driving chip 20 are connected to the same initial driving voltage Vin. The processing unit 32 is configured to adjust the voltage of the initial driving voltage Vin according to the comparison result.

It can be understood that when the backlight module 100 has a relatively larger size, and the number of the light-emitting units 10 is relatively greater. In order to better realize the function of local dimming, the light-emitting units 10 can be divided into multiple areas. The positive terminals m of the light-emitting units 10 in each area are connected to one initial driving voltage Vin. The higher the initial driving voltage Vin, the greater the brightness of the light-emitting unit 10.

In the present embodiment, the light-emitting units 10 in each light-emitting sub-area 101 are connected to the same driving chip 20 and connected to the same initial driving voltage Vin. Therefore, by adjusting the value of the initial driving voltage Vin, the light-emission brightness of the light-emitting units 10 controlled by each driving chip 20 can be adjusted. That is to say, the light-emission brightness of each light-emitting sub-area 101 can be adjusted as a whole. In this way, the brightness uniformity of the backlight module 100 can be adjusted with improved efficiency.

Figure 5:
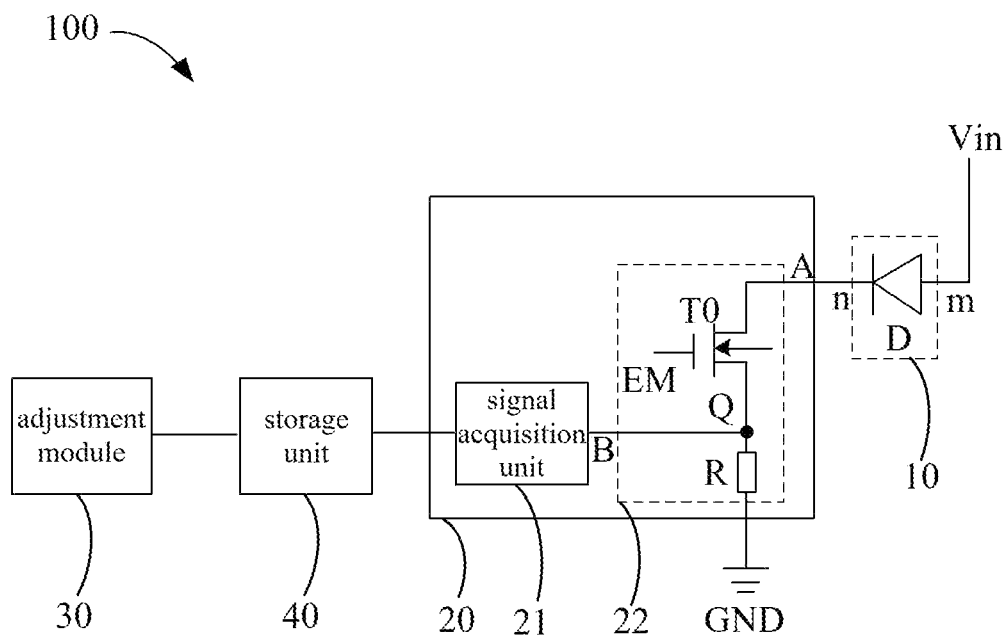
FIG. 5 is a second diagram of the backlight module according to one embodiment of the present application.

Please refer to FIG. 5. FIG. 5 is a second diagram of the backlight module according to the present application. The present embodiment is different from the backlight module 100 shown in FIG. 1 in that, the storage unit 40 is disposed outside the driving chip 20. The storage unit 40 is connected to the signal acquisition unit 21 of each driving chip 20.

By arranging the storage unit 40 outside the driving chip 20 in the present embodiment, an internal structure of the driving chip 20 can be simplified, and production costs of the driving chip 20 can be reduced. In addition to that, by arranging the storage unit 40 outside the driving chip 20, the signal acquisition units 21 in the driving chips 20 can all be connected to the same storage unit 40, thereby reducing the number of the storage units 40.

The present application further provides a display device, which includes a display panel and a backlight module. The backlight module is the backlight module 100 of any of the above embodiments, and a detailed description is omitted herein for brevity. In addition, the display device can be a smart phone, a tablet computer, an e-book reader, a smart watch, a video camera, a game console, etc., which is not limited in the present application.

Figure 6:
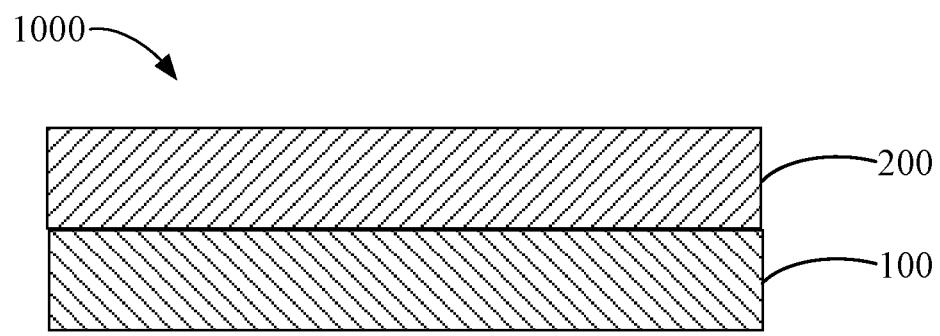
FIG. 6 is a schematic diagram of a display device according to one embodiment of the present application.

Specifically, please refer to FIG. 6, which is a schematic structural view of a display device according to the present application.

The display device 1000 includes a backlight module 100 and a display panel 200 which are disposed opposite to each other. The backlight module 100 is used to provide a light source required for normal display operations of the display panel 200.

In the display device 1000 of the present application, the backlight module 100 includes multiple light-emitting units, at least one driving chip, and an adjustment module. Each light-emitting unit has a positive terminal and a negative terminal. The positive terminals of at least some of the light-emitting units are connected to the same initial driving voltage. The driving chip includes control terminals, a signal acquisition unit, and control units connected to the respective control terminals. The control terminal is connected to the negative terminal of the corresponding light-emitting unit. The control unit includes a switch transistor and a resistor. A gate of the switch transistor is connected to a control signal, a source of the switch transistor is connected to the control terminal, a drain of the switch transistor and one end of the resistor are connected to a feedback node, and another end of the resistor is grounded. The signal acquisition unit is connected to each feedback node to acquire a feedback voltage of each feedback node. The adjustment module is connected to the driving chip and is used for adjusting the light-emission brightness of the light-emitting units according to the feedback voltages. In the present application, the signal acquisition unit is disposed in the driving chip. By collecting the feedback voltage of the feedback node, that is, collecting a voltage-to-ground of the resistor, a current flowing through each light-emitting unit can be obtained, so as to adjust the light-emission brightness of the light-emitting units to improve the light-emission uniformity of the backlight module, thereby improving the display performance of the display device 1000.

The backlight module and the display device of the present application have been introduced in detail above. The working principles and embodiments of the present application are described with specific examples. According to the ideas of the present application, those skilled in the art can still change the specific embodiments and application range. In summary, the present specification should not be construed as a limitation to the present application.

What is claimed is:

1. A backlight module, comprising:
   a plurality of light-emitting units, wherein each of the light-emitting units comprises a positive terminal and a negative terminal;
   one or more driving chips, wherein each of the driving chips comprises a plurality of control terminals, a signal acquisition unit, and a plurality of control units connected to the control terminals, wherein each of the control terminals is connected to the negative terminal of the corresponding light-emitting unit, each of the control units is connected to a control signal and is also connected to a ground terminal, each of the control units controls the corresponding light-emitting unit to emit light based on the control signal, each of the control units comprises a feedback node, and the signal acquisition unit is connected to each of the feedback nodes to acquire a feedback voltage of this feedback node; and
   an adjustment module connected to at least one of the driving chips, wherein the adjustment module adjusts brightness of each of the light-emitting units according to the corresponding feedback voltage,
   wherein in each of the at least one driving chip, the control units are connected to the control terminals in a one-to-one correspondence,
   wherein in each of the at least one driving chip, the signal acquisition unit collects the feedback voltage of the feedback node within a preset time period and obtains an average value of the feedback voltage of the feedback node within the preset time period.

2. The backlight module according to claim 1, wherein in each of the control units, the control unit comprises a switch transistor and a resistor, a gate of the switch transistor is connected to the control signal, a source of the switch transistor is connected to one of the control terminals, a drain of the switch transistor and one end of the resistor are connected to one end of the feedback node, and another end of the resistor is connected to the ground terminal.

3. The backlight module according to claim 1, wherein the signal acquisition unit comprises a plurality of collection terminals, a number of the collection terminals is greater than or equal to a number of the control terminals, and each of the collection terminals is connected to the feedback node in one of the control units.

4. The backlight module according to claim 1, wherein in each of the at least one driving chip, the signal acquisition unit is an analog-to-digital conversion module, and the signal acquisition unit converts each of the collected feedback voltages into a corresponding digital signal.

5. The backlight module according to claim 1, wherein in each of the at least one driving chip, the backlight module further comprises a storage unit, the storage unit is connected to the signal acquisition unit, and the storage unit stores the feedback voltages.

6. The backlight module according to claim 5, wherein one storage unit is disposed inside or outside each of the at least one driving chip and is connected to the signal acquisition unit of each of the at least one driving chip.

7. The backlight module according to claim 1, wherein the adjustment module comprises a comparison unit and a processing unit, the comparison unit is configured to compare each feedback voltage with a preset voltage to obtain a comparison result, the processing unit adjusts the brightness of the light-emitting units according to the comparison results.

8. The backlight module according to claim 7, wherein the control signal connected to each of the control units is a pulse width modulation (PWM) dimming signal, and the processing unit adjusts a duty cycle of the PWM dimming signal according to the corresponding comparison result.

9. The backlight module according to claim 7, wherein the control signal connected to each of the control units is a direct-current (DC) signal, and the processing unit adjusts a voltage of the control signal according to the corresponding comparison result.

10. The backlight module according to claim 6, wherein the backlight module includes a plurality of light-emitting sub-areas, each of the light-emitting sub-areas includes one of the light-emitting units, and the processing unit adjusts the brightness of each of the light-emitting units according to the corresponding comparison result.

11. The backlight module according to claim 7, wherein the backlight module comprises a plurality of light-emitting sub-areas, each of the light-emitting sub-areas includes multiple light-emitting units connected to the same driving chip, the positive terminals of the light-emitting units connected to the same driving chip are connected to a same initial driving voltage, and the processing unit adjusts a value of each of the initial driving voltages according to the corresponding comparison result.

12. The backlight module according to claim 1, wherein each of the light-emitting units comprises one or more light-emitting diodes.

13. A display device, comprising a display panel and a backlight module, the backlight module comprising:
   a plurality of light-emitting units, wherein each of the light-emitting units comprises a positive terminal and a negative terminal;
   one or more driving chips, wherein each of the driving chips comprises a plurality of control terminals, a signal acquisition unit, and a plurality of control units connected to the control terminals, wherein each of the control terminals is connected to the negative terminal of the corresponding light-emitting unit, each of the control units is connected to a control signal and is also connected to a ground terminal, each of the control units controls the corresponding light-emitting unit to emit light based on the control signal, each of the control units comprises a feedback node, and the signal acquisition unit is connected to each of the feedback nodes to acquire a feedback voltage of this feedback node; and
   an adjustment module connected to at least one of the driving chips, wherein the adjustment module adjusts brightness of each of the light-emitting units according to the corresponding feedback voltage,
   wherein in each of the at least one driving chip, the signal acquisition unit comprises a plurality of collection terminals, a number of the collection terminals is greater than or equal to a number of the control terminals, and each of the collection terminals is connected to the feedback node in one of the control units,
   wherein in each of the at least one driving chip, the signal acquisition unit collects the feedback voltage of the feedback node within a preset time period and obtains an average value of the feedback voltage of the feedback node within the preset time period.

14. The display device according to claim 13, wherein in each of the control units, the control unit comprises a switch transistor and a resistor, a gate of the switch transistor is connected to the control signal, a source of the switch transistor is connected to one of the control terminals, a drain of the switch transistor and one end of the resistor are connected to one end of the feedback node, and another end of the resistor is connected to the ground terminal.

15. The display device according to claim 13, wherein the signal acquisition unit comprises a plurality of collection terminals, a number of the collection terminals is greater than or equal to a number of the control terminals, and each of the collection terminals is connected to the feedback node in one of the control units.

16. The backlight module according to claim 13, wherein the adjustment module comprises a comparison unit and a processing unit, the comparison unit is configured to compare each feedback voltage with a preset voltage to obtain a comparison result, the processing unit adjusts the brightness of the light-emitting units according to the comparison results.

17. The display device according to claim 13, wherein the control signal connected to each of the control units is a pulse width modulation (PWM) dimming signal, and the processing unit adjusts a duty cycle of the PWM dimming signal according to the corresponding comparison result.

18. The display device according to claim 16, wherein the control signal connected to each of the control units is a direct-current (DC) signal, and the processing unit adjusts a voltage of the control signal according to the corresponding comparison result.

* * * * *